United States Patent [19]

Hamlin et al.

[11] Patent Number: 4,507,646
[45] Date of Patent: Mar. 26, 1985

[54] RADIO COMMUNICATION SYSTEM

[75] Inventors: Inge Hamlin; André Beudat, both of Stockholm, Sweden

[73] Assignee: P.S. Paging System, A.B., Stockholm, Sweden

[21] Appl. No.: 522,377

[22] PCT Filed: Nov. 12, 1982

[86] PCT No.: PCT/SE82/00384
§ 371 Date: Jul. 21, 1983
§ 102(e) Date: Jul. 21, 1983

[87] PCT Pub. No.: WO83/01877
PCT Pub. Date: May 26, 1983

[30] Foreign Application Priority Data

Nov. 16, 1981 [SE] Sweden ................ 8106805

[51] Int. Cl.³ ........................................... H04M 11/04
[52] U.S. Cl. .......................... 340/310 R; 340/310 CP; 455/41; 455/270; 343/905
[58] Field of Search ............... 307/3, 140; 340/310 R, 340/310 A, 310 CP; 455/41, 270; 368/120; 343/850, 852, 906, 720, 861, 876, 905; 242/152

[56] References Cited

U.S. PATENT DOCUMENTS

| | | | |
|---|---|---|---|
| 2,922,598 | 1/1960 | Heijnis | 242/152 |
| 2,925,598 | 2/1960 | Williams | 455/270 |
| 3,603,881 | 9/1971 | Thornton | 340/310 R |
| 3,978,469 | 8/1976 | Schaad | 340/310 R |
| 3,993,989 | 11/1976 | Held | 340/310 R |
| 4,097,801 | 6/1978 | Freeman | 368/120 |
| 4,097,808 | 6/1978 | Parke | 455/41 |
| 4,409,590 | 10/1983 | Baker | 455/41 |

FOREIGN PATENT DOCUMENTS

| | | |
|---|---|---|
| 2444041 | 3/1976 | Fed. Rep. of Germany . |
| 612552 | 7/1979 | Fed. Rep. of Germany . |
| 1538623 | 1/1979 | United Kingdom . |

Primary Examiner—James J. Groody
Assistant Examiner—Michael F. Heim
Attorney, Agent, or Firm—Pollock, Vande Sande & Priddy

[57] ABSTRACT

A paging system for use in a limited area such as an office, a factory building, a hotel, or other public building wherein the existing electrical supply network is used as the antenna of either the transmitter or the receiver. The electrical supply network is capacitively coupled to the transmitter in the preferred embodiment and in addition supplies power to the unit.

6 Claims, 4 Drawing Figures

RADIO COMMUNICATION SYSTEM

The invention relates to a radio communication system, including a method and a device for radio communication in at least one direction.

The invention is based on a desire for a paging system, which can be used in a limited area with very simple means, especially within a large building, such as an office or a factory building, a hotel, a public building or the like. In such a system it is a primary object to achieve good cooperation between the antennas of a transmitter a the receiver. Another object is to enable the use of an existing electrical network for the power supply of the transmitter or the receiver.

SUMMARY OF THE INVENTION

According to the invention, one uses an existing electrical supply network, e.g. a phase wire of an electrical supply system, as an antenna of one of the units, the electrical supply network being coupled capacitively, e.g. by means of a capacitor, to the signal connection of the unit. In principle, the antenna of either the transmitter or the receiver may consist of such an existing wiring.

In case of a paging system, a central transmitter is preferably connected to the electrical network, which in this case serves partly as a power source for the electronic and indication equipment of the transmitter, partly as an antenna in that the signal amplifier output of the transmitter is capacitively coupled to a phase or neutral wire. A certain damping of the signals along the wire will of course take place, but if the power output is of the magnitude of 50 W, sufficient electromagnetic radiation from the corresponding wire or wires can be obtained in the entire building or the like so that the transmitted radiation can be detected by means of portable, battery powered receiver units provided with ordinary ferrite antennas.

Other possible applications are data communication, data collection and alarm systems. In the latter case, a number of different transmitters can emit radio signals which are detected by an electrical supply network, which serves as a receiver antenna and is capacitively coupled to an alarm center. The transmitters as well as the central receiver may in this case be powered either by the network or by batteries.

The invention will be explained further below with reference to the appended drawings which schematically illustrate an embodiment in the form of a paging system.

Figure 1:
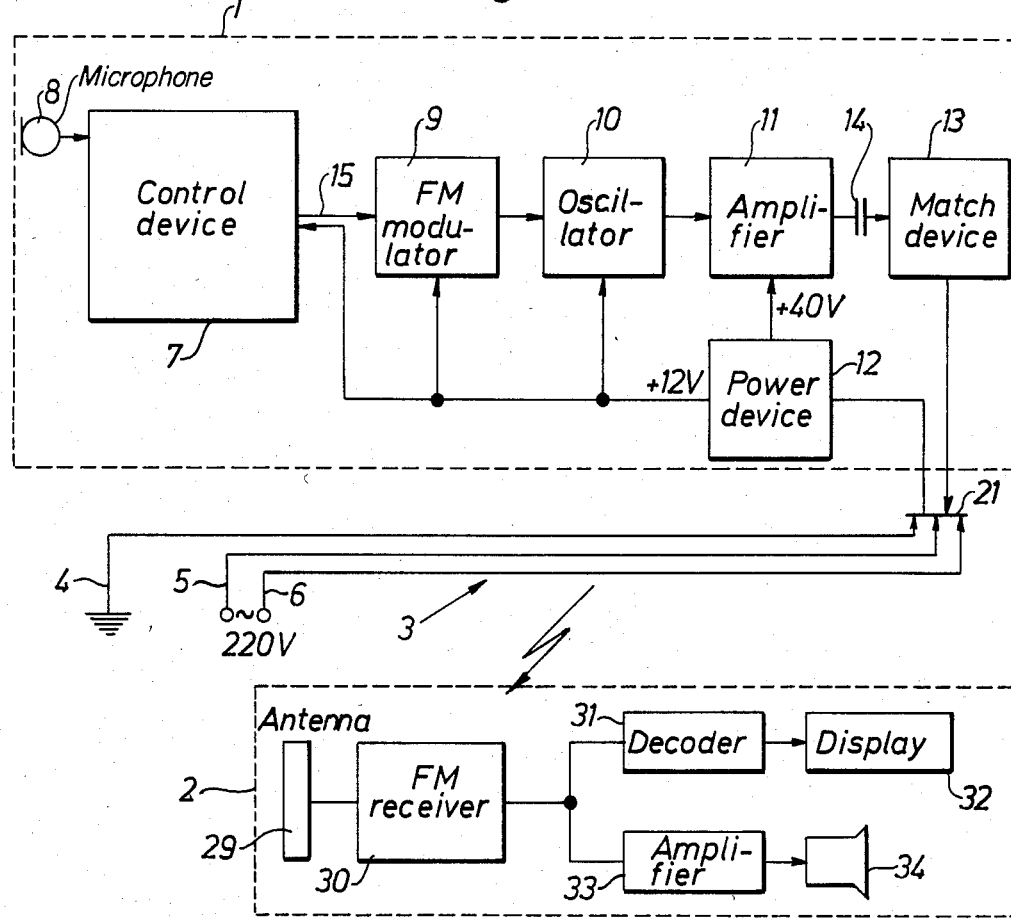
FIG. 1 shows a simplified block diagram of a transmitter which is coupled to an electrical network, and a separate receiver.

The upper part of FIG. 1 shows a transmitter and the lower part shows a receiver 2. According to the invention, the transmitter is coupled to an existing wiring network, namely an ordinary electrical supply system 3 having a group of wires comprising a protective earth 4, a neutral wire 5 and a phase wire 6 of a 220 V alternating voltage.

In the illustrated example, the transmitter 1 constitutes the central unit of a paging system and comprises a control device 7 with a microphone 8, a FM-modulator 9, an oscillator 10, an amplifier 11, a power device 12 and a match device 13, the latter being coupled to the amplifier output via a capacitor 14. The control device 7 is connected to the remaining transmitter portions 9-14 by means of a 7-wire cable 15, which partly secures the current supply from the power device 12, partly transmits coded information for addressing a receiver 2 paging device, which information is transmitted via the devices 9-13 to be described further below. For this purpose, the control device is provided with the following means (not shown): an on-off switch, a set of keys for dialling a five-digit code number e.g. in a 5-tone-CCIR-code, a display for indicating the dialled code numer, a transmitter key for emitting the coded information via the devices 9-13, a red light emitting diode or the like for indicating that such information transmission is being performed, a green light emitting diode or the like for indicating that transmission of speech is possible, and the microphone 8.

Figure 2:
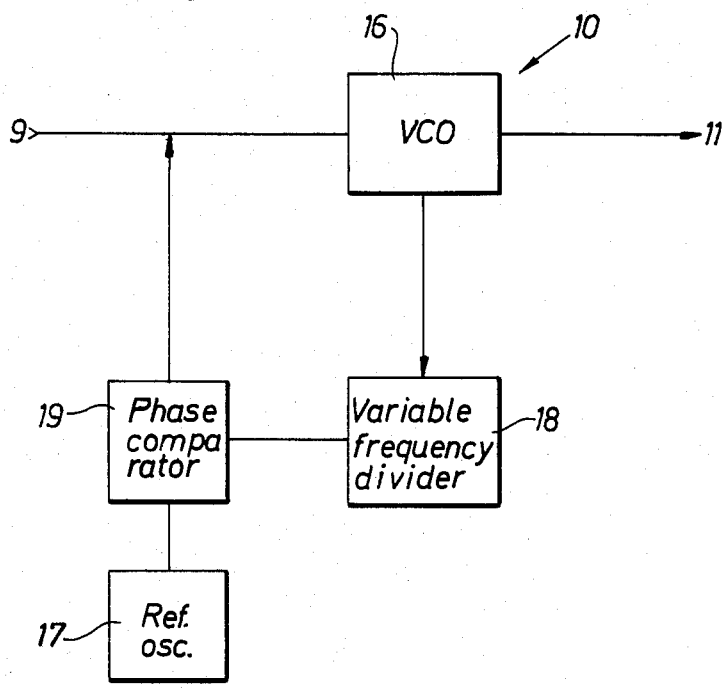
FIG. 2 shows an oscillator included in the transmitter.

The signals from the control device are modulated in the FM-modulator 9 and are transferred to the oscillator 10, the circuits of which are illustrated in FIG. 2. Thus, the oscillator comprises a s.c. synthesis oscillator consisting of a voltage controlled oscillator 16 (VCO), a crystal controlled reference oscillator 17, a variable frequency divider 18 connected to the output of the VCO oscillator 16, and a phase comparator 19 connected to the frequency divider 18 and the reference oscillator 17, these components forming a phaselocked loop. The setting of a desired frequency is effected in the frequency divider 18. Thus, at the output of the oscillator 10, a frequency modulated radio frequency signal is obtained, preferably having a carrier wave frequency of about 100 kHz and a modulation of about $\pm 3$ kHz. In principle, however, a carrier wave frequency within the region 20–500 kHz can be used.

Figure 3:
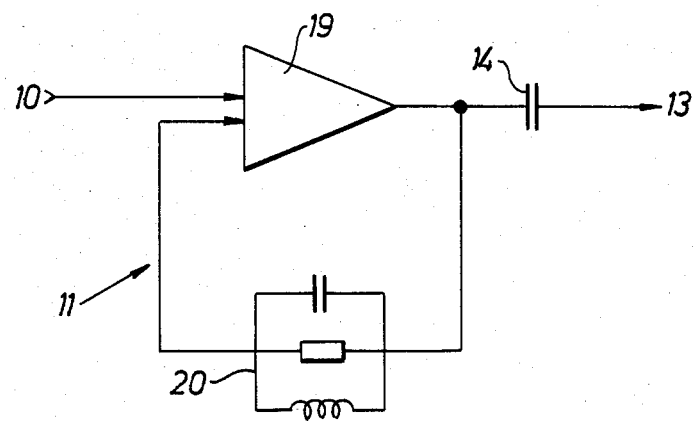
FIG. 3 shows an amplifier included in the transmitter.
Figure 4:
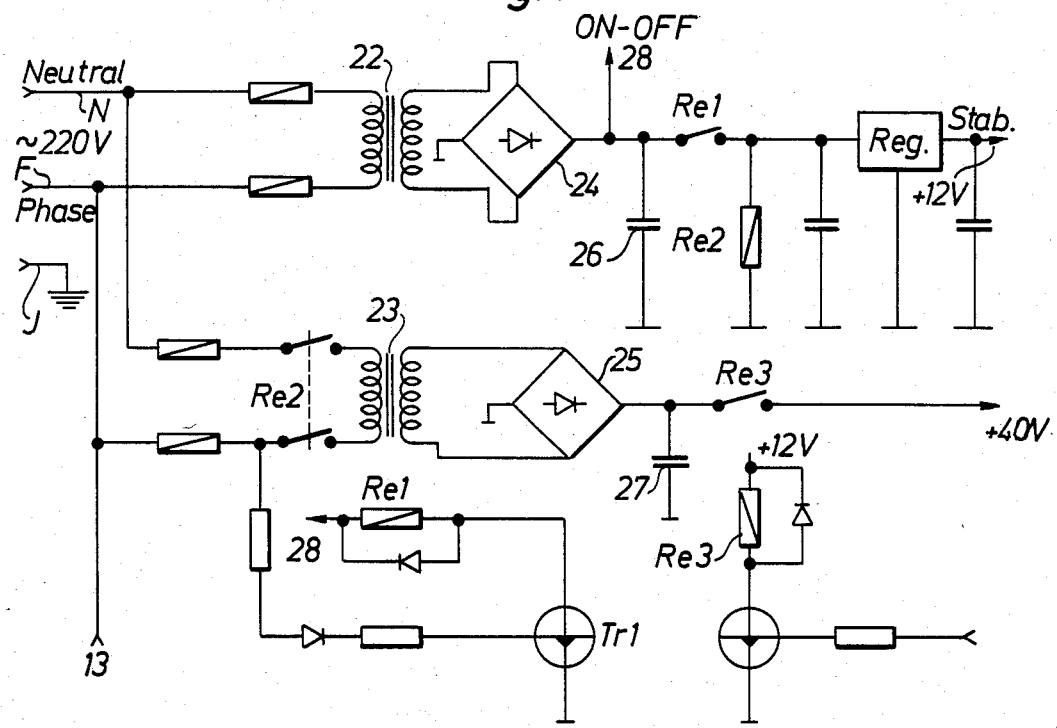
FIG. 4 shows a power unit included in the transmitter.

The FM-modulated signal is transferred to the amplifier 11, which is illustrated schematically in FIG. 3. It consists of a power stage without transformer and of the push-pull type, working in class AB. The amplifier portion 19 is fed back via a band pass filter 20 tuned to the transmitter frequency. This filter limits harmonics and other non-desired signals. The amplifier output is connected to the capacitor 14 which is dimensioned to withstand rather high voltages and currents, e.g. having a capacitance of about 1 $\mu$F and designed to withstand 600 V and 5 A. Hereby, it is possible to connect the amplifier output to the existing electrical network 3. For an impedance match, a match device 13 having variable impedance is inserted between the capacitor 14 and the electrical network connection 21, so that the load impedance can be adjusted to the impedance of the amplifier 11, and an optimal energy transfer is ensured. The connection to the network also appears from FIG. 4, which shows a circuit diagram of the power device 12 of the transmitter. Thus, the signal output of the chain 9-13 is connected (capacitively via the capacitor 14) to a phase wire, supplied with 220 V alterating voltage, by means of an ordinary plug which is connected to a protectively earthed electrical socket. By means of the same electrical socket, the drive power of the transmitter is provided. As appears from FIG. 4, the drive unit comprises for this purpose two separate transformers 22,23 and associated rectifiers 24,25 and capacitor filters 26,27. The upper power supply shown in FIG. 4 is connected, via a conduit 28—28, to the above mentioned on-off switch in the control device 7 and, via said switch, to a relay coil Re 1 in the lower power supply. The arrangement is such that a transistor Tr1, which is connected in series with the relay coil Re1, will conduct only if the plug is turned correctly, i.e. if the conduit F connected to the base of the transistor is coupled to the phase wire of the electrical network. Should the conduit F be coupled to the neutral wire instead, the transistor Tr1 remains non-conductive, which in turn results in that a relay switch Re1 in the upper power supply remains open. Both power supplies are mutually coupled also in that a relay coil Re2 in the upper supply controls a relay switch Re 2 in the other supply.

In the lower power supply, there is another relay Re3 which is actuated by the above-mentioned transmitter key of the control device 7. When the conduits F,N and J have been connected correctly, i.e. to the phase, neutral and earth wires, respectively, and all the relays Re1, Re2, Re3 are on, the upper power supply gives a stabilized d.c. voltage of 12 V to the control device 7, the modulator 9 and the oscillator 10, whereas the lower power supply supplies the power amplifier 11 with an unstabilized d.c. voltage of 40 V. If, on the other hand, no protective earth is available, or the plug is turned incorrectly, the power device 12 will not give any voltage at all.

As illustrated in FIG. 1, the radio frequency signal is transmitted via the connection (plug-socket) 21 to the phase wire 6 included in the electrical network, the phase wire being presumed to extend all around the building into its various parts. If certain groups are connected to the other two phases, a capacitive transfer coupling can be made so as to enable the signals to be distributed to the entire electrical network in the building. The phase conductor 6 or conductors will hereby serve as an antenna and will radiate radio waves of the particular frequency of about 100 kHz, i.e. a relatively long wave radiation. Actually, a considerable damping occurs along the length of the conduit counted from the connection 21, but nevertheless the radiated power has turned out to be sufficient for receiving and detecting by means of small, portable, battery driven paging receivers 2 within the entire building in question, since the electrical network normally branches into nearly all parts thereof and, consequently, the distance between a phase conductor 6 and a receiver 2 will be rather short, normally not exceeding 10 m.

Each receiver 2 comprises a ferrite antenna 29 tuned to the working frequency, a FM-receiver 30 connected to the antenna, and, in two branches in parallel to each other, a decoder 31 for detecting the transmitted digit code (e.g. a CCIR-code), possibly with an associated display 32, and a low frequency amplifier 33 having a loud-speaker 34 for speech transmission. Furthermore, the receiver 2 comprises buttons or keys (not shown) for switching the units 30,31,33 on and off as well as switching over between visual indication on the display 32 and acoustic speech transmission via the loud-speaker 34. As mentioned above, the receivers 2 are battery powered, the batteries being preferably chargeable via the electrical network when the receivers are not in use as paging units, e.g. at night.

As mentioned in the preamble, several applications are possible within the scope of the inventive idea. The conduit network can consist of any electrical supply network. Furthermore, either a transmitter or a receiver, or an apparatus serving alteratively as transmitter and receiver, can be capacitively coupled to the wiring network functioning as an antenna. The signal modulation can be performed as desired, e.g. by frequency, phase, amplitude or frequency shift modulation. Even in other respects, various modifications can be made by those skilled in the art within the scope of the claims.

We claim:

1. A paging system for a structure having a common AC power network comprising:
    a transmitting unit including:
    an oscillator for providing a radio frequency carrier wave;
    a modulator for applying an information signal to said carrier wave;
    a power amplifier for amplifying the signal modulated carrier wave;
    a power supply for providing operating current to said transmitting unit from said AC power network;
    connect/disconnect means for coupling said power amplifier output signal and said power supply means to said AC power network whereby said network radiates said coupled output signal through said structure; and
    at least one receiving unit having an antenna and demodulating circuit for receiving and demodulating said radiated signal.

2. The paging system of claim 1 comprising switching means for enabling said transmitting unit when said power amplifier output signal is effectively coupled to said AC power network.

3. A paging system according to claim 1 wherein said connect/disconnect means comprises a single plug and socket combination.

4. The paging system of claim 1 wherein said power amplifier output signal is capacitively coupled to said AC power network.

5. The paging system of claim 1 including a microphone for supplying said information signal to said modulator.

6. A method as defined in claims 1 or 2, wherein one or more phase wires of said AC power network receive said amplifier output signal and are used as an antenna.

* * * * *